United States Patent [19]

Coussau et al.

[11] Patent Number: 4,494,907

[45] Date of Patent: Jan. 22, 1985

[54] POSITIONING AND REMOVAL DEVICE FOR A CHECKING MEANS OR A TOOL IN A RECEIVER INSTALLATION

[75] Inventors: Jean Coussau, Paris; Georges Clar, Lyons, both of France

[73] Assignee: Framatome, Courbevoie, France

[21] Appl. No.: 362,824

[22] Filed: Mar. 29, 1982

[30] Foreign Application Priority Data

Apr. 17, 1981 [FR] France .................. 81 07835

[51] Int. Cl.³ ............................................ B65G 47/00
[52] U.S. Cl. .................................. 414/749; 324/220; 376/249; 376/254
[58] Field of Search ............... 414/749, 787; 104/119; 105/29 R, 30; 165/11 R, 11 A; 376/245, 249, 254; 73/622, 623, 432 B; 324/219-221

[56] References Cited

U.S. PATENT DOCUMENTS

| | | | |
|---|---|---|---|
| 2,472,319 | 6/1949 | Turner | 324/220 |
| 4,194,149 | 3/1980 | Holt et al. | 324/220 |
| 4,249,413 | 2/1981 | Denis | 165/11 R X |
| 4,363,592 | 12/1932 | Tedder | 414/590 |

*Primary Examiner*—Joseph E. Valenza
*Assistant Examiner*—Donald W. Underwood
*Attorney, Agent, or Firm*—Pollock, Vande Sande & Priddy

[57] ABSTRACT

A positioning and removal device for a checking means or a tool in a receiver installation, in a medium inaccessible to an operator. The device comprises a flexible guide track fixed to the receiver installation, a carriage movable over the track including a drive motor and a gear wheel, a loading sleeve fast to the carriage closed by a part and including a cam and a groove, a tool support unit provided with catches and an arrangement for hooking the support unit on a complementary arrangement borne by the installation. The forward movement of the carriage permits the opening of the hooking arrangement and hooking of the support unit onto the sleeve at the level of the groove by the catches, when the part is in out-of-service position. When the part is in service position on the sleeve, the forward movement of the carriage permits the transportation and hooking of the support unit of the tool to the receiver installation. The device is particularly useful in checking the tubes of a pressurized water nuclear reactor steam generator.

2 Claims, 3 Drawing Figures

POSITIONING AND REMOVAL DEVICE FOR A CHECKING MEANS OR A TOOL IN A RECEIVER INSTALLATION

FIELD OF THE INVENTION

The invention relates to a device for positioning and removing checking means or a tool in a receiver installation or equipment (or servicing structure) in operating position in an environment not accessible to an operator.

BACKGROUND OF THE INVENTION

For checking or machining operations or repairs which must be carried out in inaccessible locations installations permitting these operations to be carried out at a distance are provided.

For example, in the case of pressurized water nuclear reactors, special equipment is available for carrying out checking operations inside the tubes or in the water container of the steam generators. In this case, intervention by an operator directly inside the water container must be avoided, since this part of steam generators is in contact, when the generator is in service, with the water of the primary circuit transporting radioactive elements, and remains itself radioactive.

Recourse has therefore been had to remote-controlled intervention devices which are more or less complex and which nonetheless require human interventions at the start or even in the course of operation.

Such devices generally include an installation designed to receive the tool or the checking or observation means which can be positioned beneath the tube plate of the steam generators, or the position of which can be modified with respect to the tube plate, by actuating these operations at a distance.

However, if the tool or the checking device placed in the receiver installation in operating position is to be replaced in the hostile environment, it is not possible, with currently known devices, to effect this operation at a distance. Instead, it is necessary to return the receiver installation, for the checking means or the tooling, into an accessible area in order to carry out the changing of the tool or of the checking means.

This operation must be carried out on equipment which has been in a radioactive environment, and on the other hand, the dismantling and reassembly operations of the equipment may be long and delicate.

SUMMARY OF THE INVENTION

It is therefore an object of the invention to provide a device for positioning or removing a checking means or a tool in a receiver installation in operating position in a medium not accessible to an operator, enabling the replacement of the checking means or of the tool without the need to extract the receiver installation from the hostile environment inaccessible to the operator.

For this purpose, the device according to the invention comprises:

a guidance and displacement track constituted by a rack of flexible material which can follow a non-rectilinear path, fixed at an anchoring point to the receiver installation at one of its ends and of sufficient length for its other end to terminate outside of the non-accessible medium, a carriage movable on the guide track, including a motor and a gear wheel mounted on the shaft of the motor and engaging the rack, a loading sleeve fast to the carriage, of tubular shape, constituting at its forward end, with respect to the movement of the carriage towards the receiver installation, an actuating cam, including on its inner surface, a hooking groove on its inner surface and bearing a removable closure part obturating at least partly the internal bore of the sleeve at its rear end, a support unit for the checking means provided with catches for hooking this support unit to the sleeve, at the level of the groove formed on its inner surface, the rear portion of which can be engaged in the sleeve to come into support on the closure part, and the front portion of which includes hooking means complementary with the hooking means borne by the receiver installation, the cam formed on the sleeve being a cam for actuating the hooking means of the support unit to the receiver installation, this actuating in the direction of opening and hooking the catches of the support unit to the sleeve being caused by a forward movement of the carriage, when the closure part of the sleeve is in an out-of-service position, while the transport and hooking of the support unit to the receiver installation are made possible also by a forward movement of the carriage, when the closure part is in service position in the sleeve.

In order that the invention may be more easily understood, there will now be described, by way of non-limiting example, with reference to the accompanying drawing, one embodiment of a device according to the invention for the checking of pressurized water nuclear reactor steam generator tubes, using a rotary eddy current probe.

DETAILED DESCRIPTION

Figure 1:
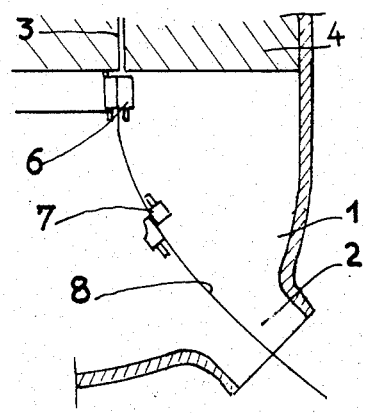
FIG. 1 shows a general view of an embodiment of the device and of its receiver equipment in position inside a water container of a steam generator of a pressurized water nuclear reactor.

FIG. 1 shows the water container of a pressurized water nuclear steam generator including an opening 2 enabling the passage of the checking installation of the tube 3 passing through the tube plate 4, which has considerable thickness.

A receiver installation 6 is fixed beneath the tube plate so as to permit the checking of one or several tubes 3 by means of a eddy current probe borne by the receiver installation 6.

FIG. 1 also shows a displacement track for the positioning and extraction device 7 constituted by a rack 8 of flexible material permitting a non-rectilinear path, for example curved, for the device 7 between the working stations located outside the steam generator and the receiver installation 6.

Figure 2:
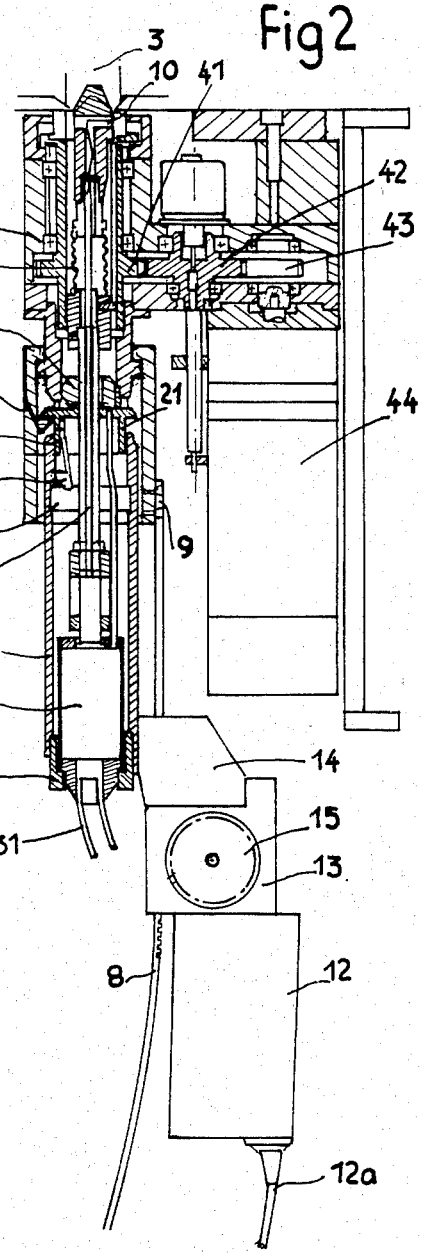
FIG. 2 shows a view in a larger scale of the embodiment of the device of FIG. 1 at the moment of positioning the checking means on its receiver installation.

Referring to FIG. 2, it is seen that the end of the rack 8 is fixed by screws to the receiver installation 6 at its end 9 located inside the steam generator.

The means for checking the tubes 3 of the steam generator is constituted by an eddy current probe 10 which can be extracted or placed in position in the receiver installation 6 by means of the device 7.

The movable portion of the positioning and extraction device 7 is constituted by an electric motor 12, a guidance and drive unit 13 and a support 14.

The motor 12 is supplied by a flexible lead 12a which follows the movable portion 7 of the extraction device in its movement.

The guidance and drive unit 13 includes, in particular, a gear wheel 15 engaging the rack 8 and driven by the shaft of the motor 12.

The support 14 bears the sleeve 16 which is partly obturated at its rear end by a ring 17 which can be screwed on to the sleeve, on the rear portion of the latter, if one considers the direction of movement of the movable unit 7 from the outside of the steam generator to the receiver installation 6.

The sleeve 16 of tubular shape also includes on its inner surface a hooking groove 18 and in its forward portion, on its outer surface, a profiled portion 19 constituting an actuating cam.

The movable unit 7 bearing the sleeve 16, equipped with the ring 17, can be moved over the rack 8 by means of the motor 12 driving the gear wheel 15 engaging the teeth of this rack 8.

FIG. 2 also shows the tool 10 and its support unit in their operating position on the receiver installation 6, the movable positioning and extraction unit being in its end position in which it has just effected the hooking of the support unit of the probe 10 to the receiver installation 6.

Figure 3:
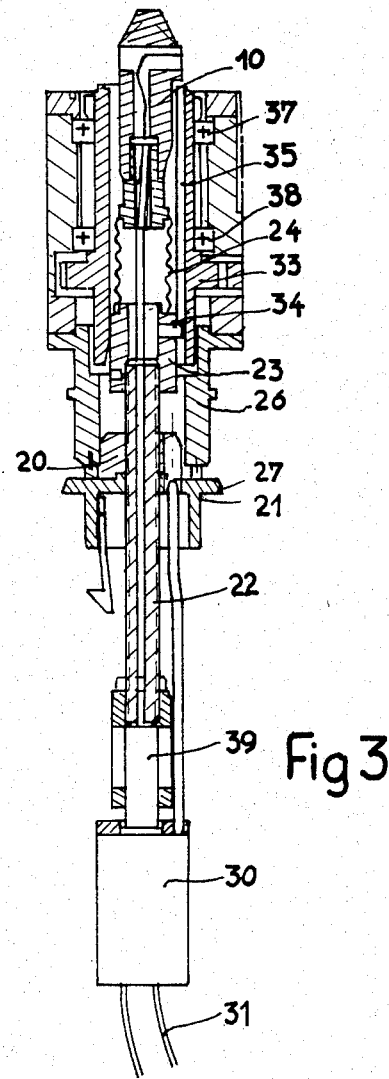
FIG. 3 shows in a large scale a view of the checking means and its support unit in operating position on the receiver installation.

The support unit of the probe 10 includes, as shown in FIGS. 2 and 3, a nut 20 fastened to a locking ring 21, a screw 22 in engagement with the tapped portion of the nut 20 and a drive part of the probe 23 fastened to the screw 22 at one of its ends and connected, through an elastic member 24 such as a bellows, to the probe 10.

The nut 20 has a shape enabling it to be engaged inside the lower portion 26 of the receiver installation, so that this nut is locked in rotation. Stop pins permit this locking to be effected.

The nut 20 is fastened to the locking ring 21 which includes a profiled front portion 27 enabling it to be hooked to catches 28 borne by the receiver installation 6, and constituted by elastic blades bearing at their end the catch itself on which the locking ring comes to rest when the support of the tool is fixed to the receiver installation as shown in FIG. 2.

The locking ring also bears catches 29 on its inner surface enabling hooking of the tool support to the sleeve, as will be described hereinbelow.

The screw 22 is connected at one of its ends to a joint 30 enabling the supply of the probe and the reception of data by means of a cable 31 connected to this rotary joint. The measuring wires of the probe pass into the central bore of the screw 22, which is hollow.

At its other end, the screw 22 is connected to the drive part 23 which is itself fast in rotation to a movable mechanism 33 by means of a key 34 movable in a groove 35 formed in the movable mechanism 33 and enabling the translation movements of the probe with respect to this movable mechanism 33 rotatably mounted by means of bearings 37 and 38 on the receiver installation 10.

The screw 22 includes, on the other hand, a smooth cylindrical extension 39 which can be moved in translation inside the joint 30, in the course of the movements of the probe 10.

The mobile mechanism 33 is rotated, through a pinion assembly 41, 42, 43, by means of a motor 44 fixed to the receiver installation.

When the probe is in position on the receiver installation, as shown in FIGS. 2 and 3, the rotation of the motor 34 results in the rotation of the mobile mechanism 33, of the drive part 23 and of the screw 22 which also causes the rotation of the probe 10 at the same time as a translation movement of the latter in a vertical direction, the nut 20 in which the screw 22 is engaged being locked in rotation by the portion 26 of the receiver installation 6.

The probe therefore describes a helix inside the tube 3, which permits checking of this tube, over a certain length and over the whole of its periphery. The length of travel of the probe is limited by the length of the groove 35 formed in the part 33 and by the length of the extension 39 of the screw 22.

The displacement of the receiver installation with respect to the tube plate permits successive examination of the tubes of the steam generator.

When it is desired to bring another probe the receiver installation, the movable unit 7 and the sleeve 16 being outside the enclosure, extraction of the probe 10 must first be carried out. It suffices, for this purpose, to advance the movable unit 7 by placing the motor 12 in operation, up to the receiver installation, the sleeve becoming placed around the rear portion of the probe support, the dimension of this portion constituted by the joint 30, the extension 39 of the screw 22 and a portion of this screw 22, being provided so as to permit engagement of the sleeve.

To carry out the extraction of a probe or of a tooling at the receiver installation, the ring 17 partly closing the rear end of the sleeve has been dismounted or placed in withdrawn position, which permits the sleeve to be advanced towards the receiver installation, beyond the position shown in FIG. 2. In fact, the ring 17 being dismounted or withdrawn, the rear portion of the probe support constituted by the joint 30 does not come into abutment on this ring 17.

In this forward movement of the sleeve, the portion 19 constituting a cam comes into engagement on the end of the catches 28 which form a ramp inclined with respect to the vertical. This movement permits the catches to be disengaged, which releases the locking ring 21. The latter comes to rest on the front end of the sleeve, whereas the catches 29 become engaged in the groove 18 provided inside the sleeve. The probe support is then hooked onto the sleeve and it is possible to bring back the support unit and the probe to the working station by reversing the movement of the mobile unit 7 driven by the motor 12.

To introduce a new tool or a new probe into the steam generator and to fix this new tool to the receiver installation, it suffices to place this new tool or this new probe on the support unit and to replace the ring 17 on the rear end of the sleeve.

For the transportation of the support unit and of the probe, this support unit rests through its rear portion on the ring 17 as shown in FIG. 2.

At the end of the forward movement of the support unit, the profiled portions 27 of the locking ring come into contact with the catches 28, manoeuvering the latter and producing hooking of the locking ring to these catches, as shown in FIG. 2.

It is then possible to return the mobile unit 7 and the sleeve to the work station.

It will be clear that it is possible to carry out the changing of the tool or of the checking probe inside the steam generator, without having to dismount the receiver installation and without human intervention inside the steam generator.

On the other hand, all the manoeuvers are carried out in extremely positive manner, by means of purely mechanical hooking and extraction devices.

The invention is not limited to the embodiment which has just been described; it encompasses on the contrary all modifications.

Thus it is possible to conceive a support unit for the probe different from that which has been described and which permits the production of a helicoidal movement of the probe inside the tubes.

The device is also applicable in the case of a tooling or any checking means the movement of which inside the tubes to be checked can be adapted to the needs of the checking or machining to be carried out.

Finally, the device according to the invention is useful in all cases where it is desired to effect the replacement of a tool or of a checking means in an inaccessible spot or in a hostile environment, for example, at high temperature or exposed to radiation.

We claim:

1. Positioning and removal device for checking means or a tool in a receiver installation, in operating position in a medium inaccessible to an operator, said device comprising:
    (a) a guidance and displacement track constituted by a rack of flexible material which can follow a non-rectilinear path, fixed at an anchoring point to the receiver installation at one of its ends and of sufficient length for its other end to terminate outside of said inaccessible medium;
    (b) a carriage movable on said guidance track including a motor and a gear wheel rotated by said motor and engaging with said rack;
    (c) a loading sleeve fastened to said carriage, of tubular shape, constituting at its forward end, in the direction of movement of said carriage towards said receiver installation, an actuating cam on its outer surface, including on its inner surface a hooking groove and bearing a removable closure part obturating at least partly the inner bore of said sleeve at its rear end;
    (d) a support unit for said checking means provided with catches for hooking said support unit to said sleeve at the level of said groove, the rear portion of which is engageable in said sleeve to become supported on said closure part, and the forward portion of which includes hooking means complementary to the hooking means borne by said receiver installation, said cam formed on said sleeve being a cam for actuating the hooking means of said support unit on said receiver installation, this actuation in the direction of opening and hooking of the catches of said support unit on said sleeve being caused by a forward movement of said carriage when the closure part of said sleeve is in an out-of-service position, while the transport and hooking of the support unit on said receiver installation are produced also by forward movement of said carriage when said closure part is in service position in said sleeve.

2. Positioning and removal device according to claim 1, wherein said support unit includes a nut having a shape permitting its engagement and locking in rotation in said receiver installation, a locking ring fastened to said nut bearing the hooking means of said support unit on said sleeve and on said receiver installation and a screw engaged in said nut fastened at one end to the rear portion of the support unit which can be engaged in said sleeve, and at its other end to a drive part on which is fixed said checking means or tool, bearing means permitting its rotation by a movable mechanism borne by said receiver installation and its movement in translation inside said movable mechanism.

* * * * *